(12) United States Patent
Ramaekers

(10) Patent No.: US 9,301,448 B2
(45) Date of Patent: Apr. 5, 2016

(54) STRIPPER WITH A PLURALITY OF DUCTING UNITS

(71) Applicant: Brian Ramaekers, Nazareth, TX (US)

(72) Inventor: Brian Ramaekers, Nazareth, TX (US)

( * ) Notice: Subject to any disclaimer, the term of this patent is extended or adjusted under 35 U.S.C. 154(b) by 151 days.

(21) Appl. No.: 13/944,874

(22) Filed: Jul. 17, 2013

(65) Prior Publication Data

US 2014/0020353 A1    Jan. 23, 2014

Related U.S. Application Data

(60) Provisional application No. 61/672,742, filed on Jul. 17, 2012.

(51) Int. Cl.
*A01D 46/12* (2006.01)
*A01D 46/08* (2006.01)

(52) U.S. Cl.
CPC ............... *A01D 46/12* (2013.01); *A01D 46/08* (2013.01); *Y10T 29/49448* (2015.01)

(58) Field of Classification Search
CPC ........ A01D 46/14; A01D 46/08; A01D 46/12
USPC ................. 56/28, 33, 30, 13.3, 16.6
See application file for complete search history.

(56) References Cited

U.S. PATENT DOCUMENTS

| | | | | |
|---|---|---|---|---|
| 2,719,394 A * | 10/1955 | Thomann et al. | ............... | 56/12.6 |
| 3,373,547 A * | 3/1968 | Hubbard | ........................... | 56/44 |
| 5,212,937 A * | 5/1993 | Fachini et al. | ..................... | 56/28 |
| 5,311,728 A * | 5/1994 | Schlueter | ......................... | 56/33 |
| 6,018,938 A | 2/2000 | Deutsch et al. | | |
| 6,205,756 B1 * | 3/2001 | Orsborn et al. | .................... | 56/30 |
| 6,272,821 B1 * | 8/2001 | Wigdahl | ............................ | 56/30 |
| 6,321,516 B1 * | 11/2001 | Wigdahl et al. | .................... | 56/30 |
| 6,701,701 B2 * | 3/2004 | Wigdahl et al. | ................... | 56/28 |
| 6,850,252 B1 * | 2/2005 | Hoffberg | ......................... | 715/716 |
| 8,073,599 B2 * | 12/2011 | Goering et al. | ................. | 701/50 |
| 2003/0019200 A1 * | 1/2003 | Lemke et al. | ..................... | 56/41 |
| 2006/0005521 A1 * | 1/2006 | Goering et al. | .................... | 56/30 |
| 2008/0022648 A1 * | 1/2008 | Fox et al. | ......................... | 56/341 |
| 2009/0019828 A1 * | 1/2009 | Bennett | ............................ | 56/33 |

* cited by examiner

*Primary Examiner* — Árpád Fábián-Kovács
(74) *Attorney, Agent, or Firm* — Shannon L Warren

(57) ABSTRACT

An stripper comprising a plurality of ducting units, a platform, a bin, a header, and a chassis. The platform supporting the plurality of ducting units. The bin capable of holding a harvested crop. The header is capable of harvesting the harvested crop. The plurality of ducting units convey the harvested crop from the header to the bin. The chassis supports the platform, the bin, the headers and the plurality of ducting units. The plurality of ducting units comprise hollow channel comprising a passage between an entry at a first end and an exit at a second end of the plurality of ducting units. The channel in the plurality of ducting units are formed between the entry to the exit in a two vectors. The two vectors comprise a y-axis and a z-axis. The channel in the plurality of ducting units are capable of moving the harvested crop from the header to the bin without moving the harvested crop in an x-axis direction and thereby limit clogging of the harvested crop in the passage of the plurality of ducting units.

8 Claims, 9 Drawing Sheets

STRIPPER WITH A PLURALITY OF DUCTING UNITS

BACKGROUND

This application is a nonprovisional filing which will be filed on Jul. 17, 2013 on the basis of provisional application No. 61/672,742 which was filed on Jul. 17, 2012.

This disclosure relates generally to an improved stripper. In one embodiment, the term "stripper" can mean an agricultural vehicle capable of harvesting a crop (such as cotton). Other terms synonymous to "stripper" can include picker, combine, tractor, or similar.

One example of a stripper which has been improved on by the currently disclosed system is found in U.S. Pat. No. 6,018,938 of Mr. Copley et sec. Mr. Copley's stripper configuration discloses two auger portions for moving material inwardly toward a central location. However, Mr. Coley's augers are not properly configured to channel harvested cotton into a cleaner/storage bin in an expedient manner.

None of the known patents or inventions whether taken singularly or in combination are seen to anticipate the current disclosure. Accordingly, an improved cotton stripper with dual burr extractor, as disclosed, should be approved for patent eligibility.

SUMMARY

An improved stripper and a method of manufacture thereof are disclosed.

Said improved stripper comprising a plurality of ducting units, a platform, a bin, a header, and a chassis. Said platform supporting said plurality of ducting units. Said bin capable of holding a harvested crop. Said header is capable of harvesting said harvested crop. Said plurality of ducting units convey said harvested crop from said header to said bin. Said chassis supports said platform, said bin, said headers and said plurality of ducting units. Said plurality of ducting units comprise hollow channel comprising a passage between an entry at a first end and an exit at a second end of said plurality of ducting units. Said channel in said plurality of ducting units are formed between said entry to said exit in a two vectors. Said two vectors comprise a y-axis and a z-axis. Said channel in said plurality of ducting units are capable of moving said harvested crop from said header to said bin without moving said harvested crop in an x-axis direction and thereby limit clogging of said harvested crop in said passage of said plurality of ducting units.

Said method of manufacturing said improved stripper comprising: replacing a platform from a stripper with an extended platform, supporting a plurality of ducting units on said extended platform, and attaching a cab of said stripper at a forward position of said extended platform. Said stripper further comprises a bin, a header, and a chassis. Said platform supporting said plurality of ducting units. Said bin capable of holding a harvested crop. Said header is capable of harvesting said harvested crop. Said plurality of ducting units convey said harvested crop from said header to said bin. Said chassis supports said platform, said bin, said headers and said plurality of ducting units. Said plurality of ducting units comprise hollow channel comprising a passage between an entry at a first end and an exit at a second end of said plurality of ducting units. Said channel in said plurality of ducting units are formed between said entry to said exit in a two vectors. Said two vectors comprise a y-axis and a z-axis. Said channel in said plurality of ducting units are capable of moving said harvested crop from said header to said bin without moving said harvested crop in an x-axis direction and thereby limit clogging of said harvested crop in said passage of said plurality of ducting units.

DETAILED DESCRIPTION

Described herein is an improved cotton stripper with dual burr extractor. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1A:
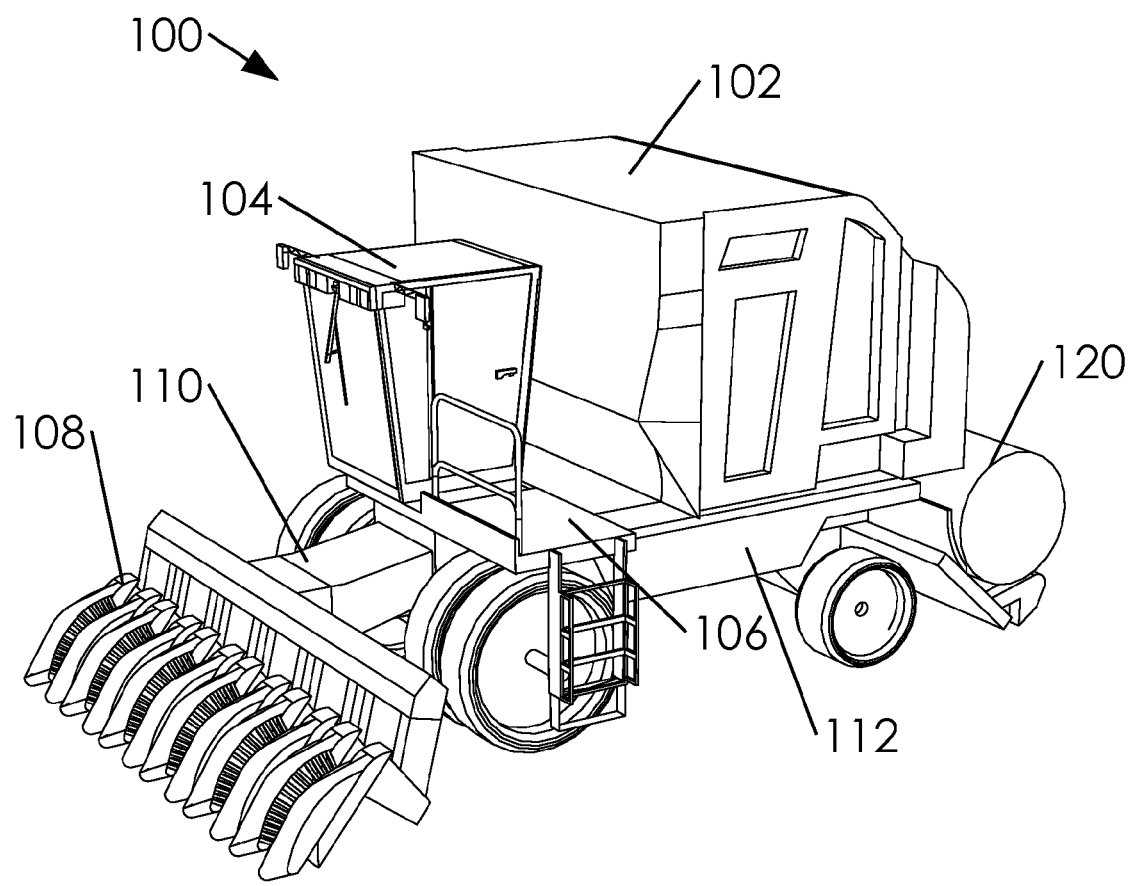
FIGS. 1A, 1B and 1C illustrate a perspective assembled overview, a perspective exploded view and an elevated exploded side of a stripper.
Figure 1B:
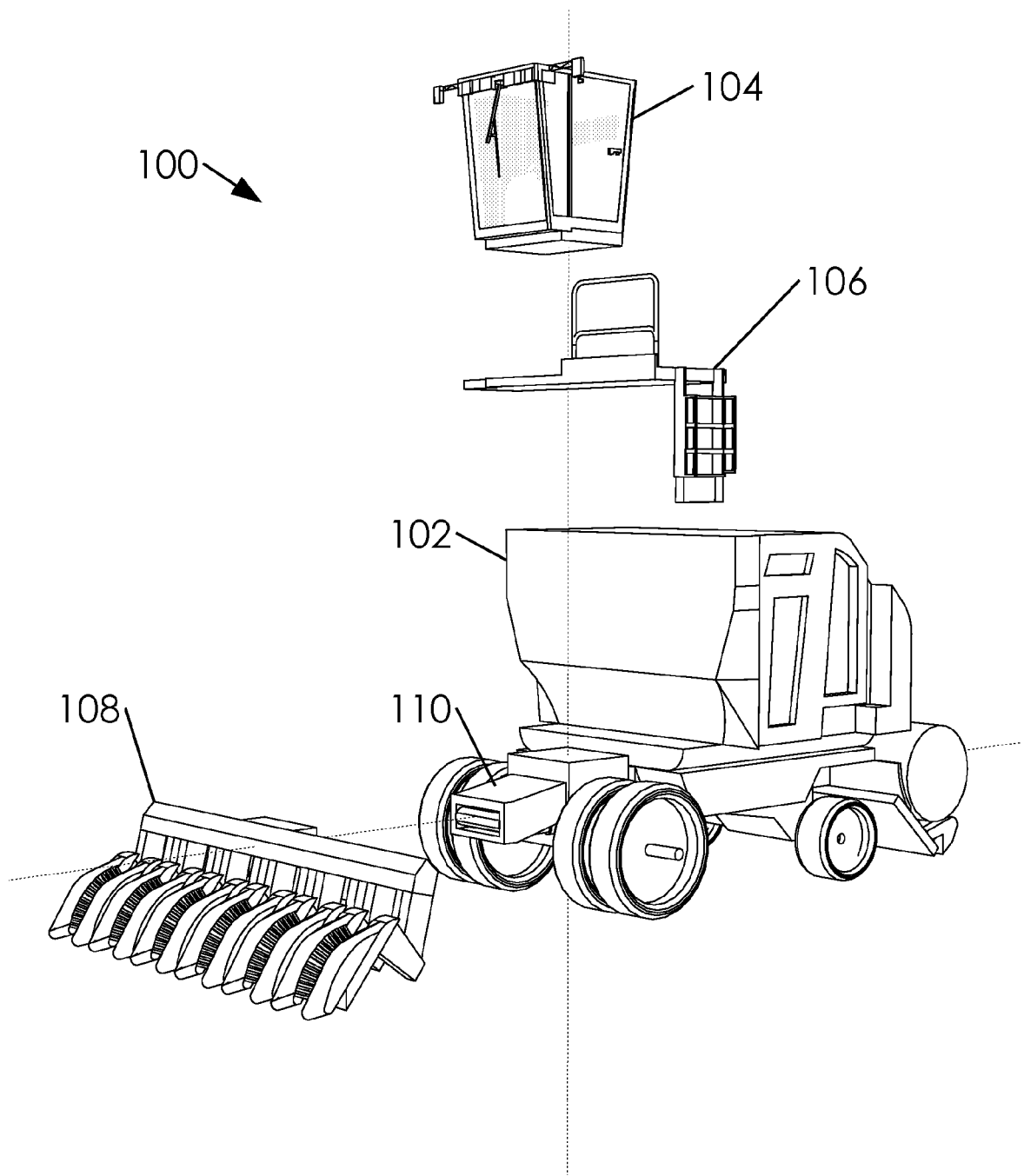
Figure 1C:
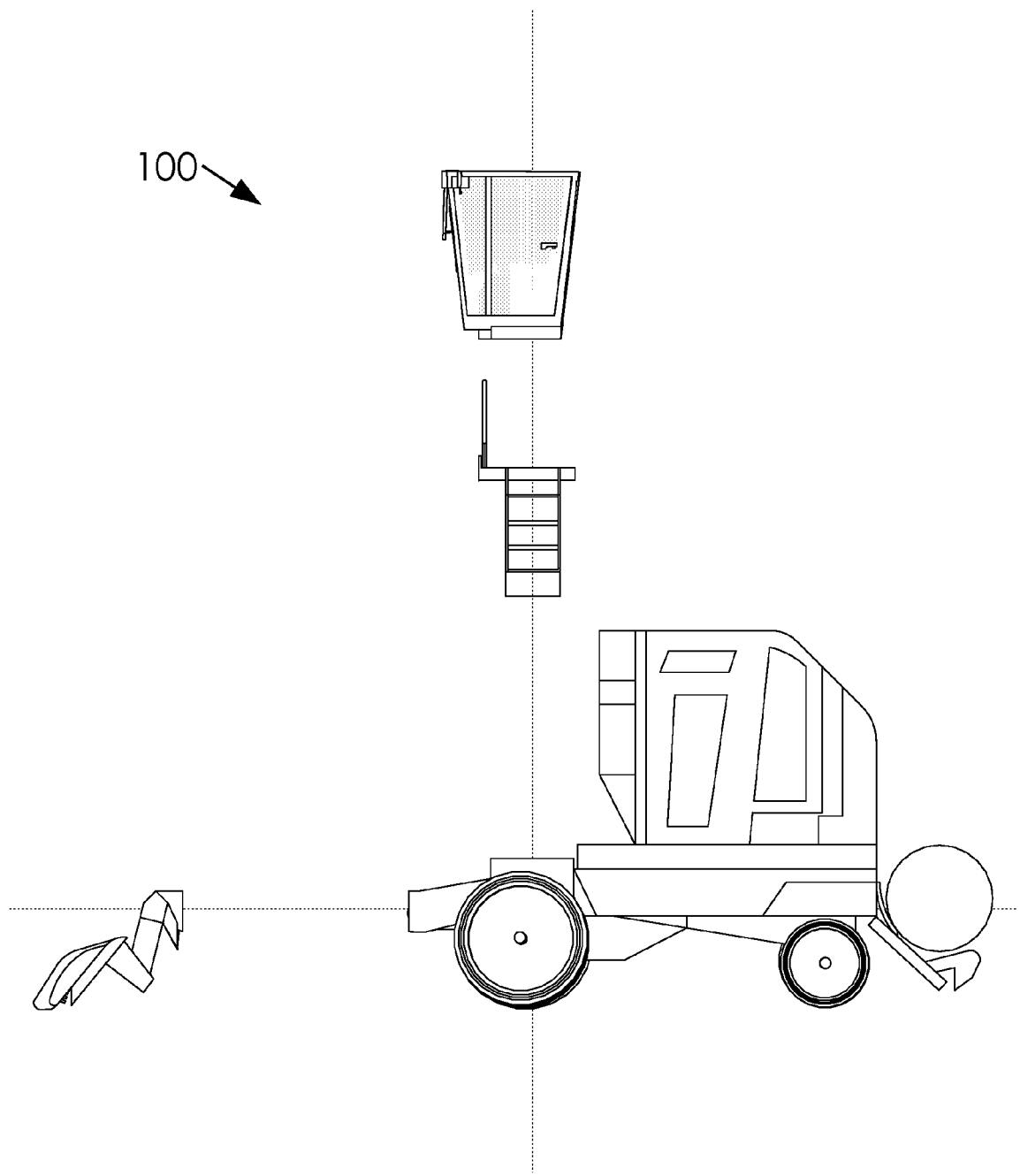

FIGS. 1A, 1B and 1C illustrate a perspective assembled overview, a perspective exploded view and an elevated exploded side of a stripper 100. In one embodiment, said stripper 100 can comprise a prior art embodiment of a stripper. In one embodiment, said stripper 100 can comprise a bin 102, a cab 104, a platform 106, a header 108, a ducting system 110, and a chassis 112. In one embodiment, said stripper 100 can comprise a tractor of many types. In one embodiment, said stripper 100 can be used to harvest cotton or other agricultural materials. In one embodiment, said stripper 100 can comprise said chassis 112 comprising four or more wheels capable of navigating an agricultural environment. In one embodiment, said bin 102, said cab 104 and said platform 106 can attach to said chassis 112. In one embodiment, said cab 104 is where a user can operate said stripper 100. In one embodiment, said cab 104 can attach to said platform 106. In one embodiment, said stripper 100 can harvest a crop by running said header 108 over said crop, cutting said crop with said header 108 from a ground surface, feeding said crop into said ducting system 110, and delivering said crop to said bin 102. In one embodiment, said bin 102 can process said crop into round modules (such as a module 120) or into rectangular modules (as is known in the art but not illustrated here).

In one embodiment, creating an improved stripper can comprise disassembling said stripper 100, as illustrated in FIGS. 1B and 1C. In one embodiment, disassembling said stripper 100 can comprise: removing said cab 104 and said platform 106 from said stripper 100, and in some cases removing said header 108 from said ducting system 110.

Figure 2A:
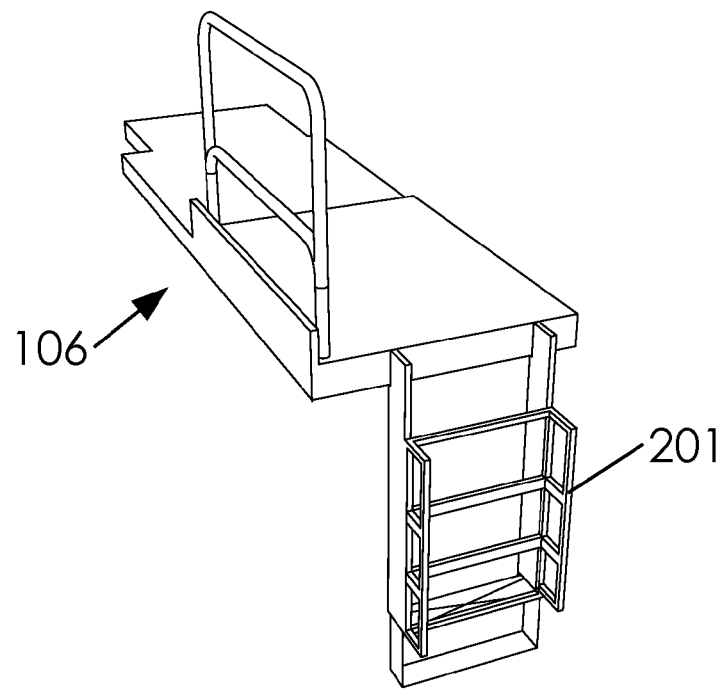
FIGS. 2A and 2B illustrate perspective overviews of said platform and an extended platform.
Figure 2B:
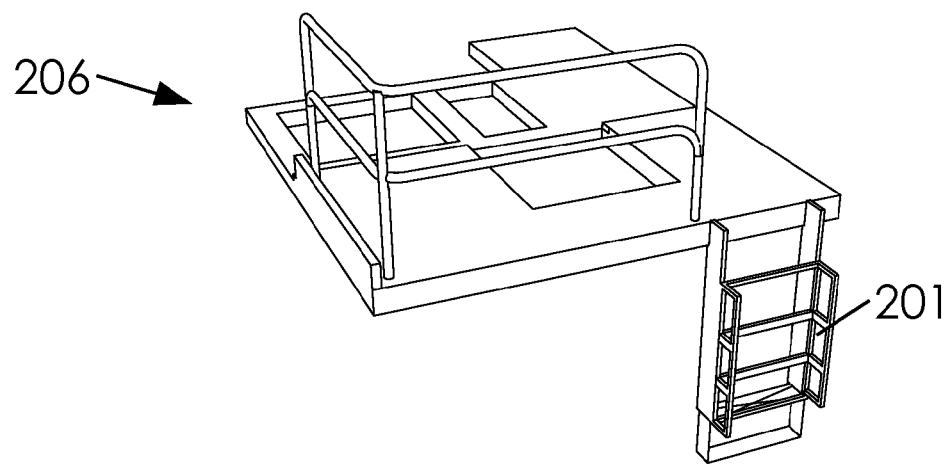

FIGS. 2A and 2B illustrate perspective overviews of said platform 106 and an extended platform 206. In one embodiment, creating said improved stripper can further comprise: replacing said platform 106 with said extended platform 206. In one embodiment, each of said platform 106 and/or said extended platform 206 can comprise a ladder 220. In one embodiment, said ladder 220 can be useful for climbing onto said stripper 100 at said platform 106 and/or said extended platform 206. Dimensions of said platform 106 and/or said extended platform 206 are discussed further, infra.

Figure 2C:
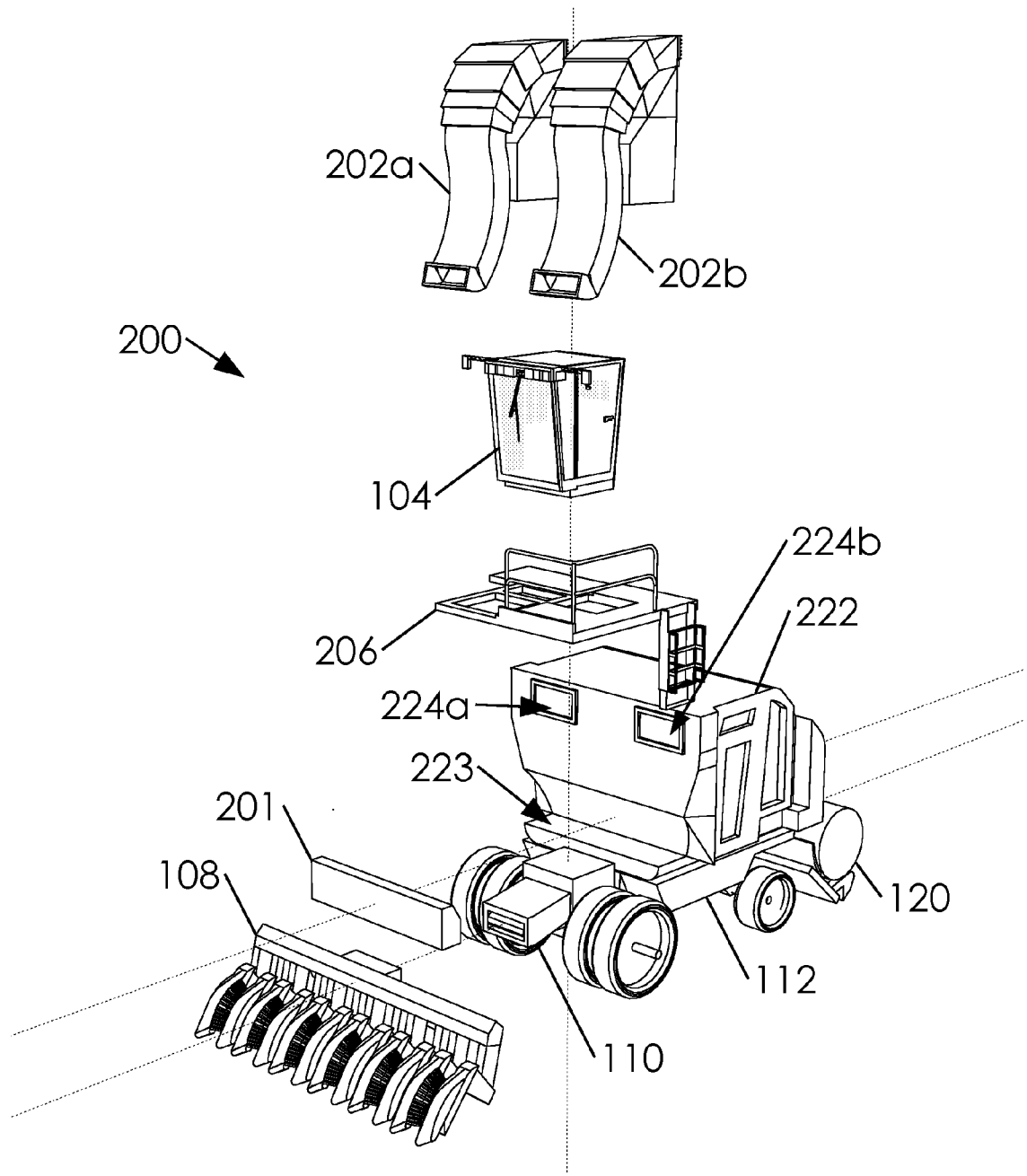
FIGS. 2C, 2D, 2E and 2F illustrate a series of views of said stripper being reconstructed as an improved stripper.
Figure 2D:
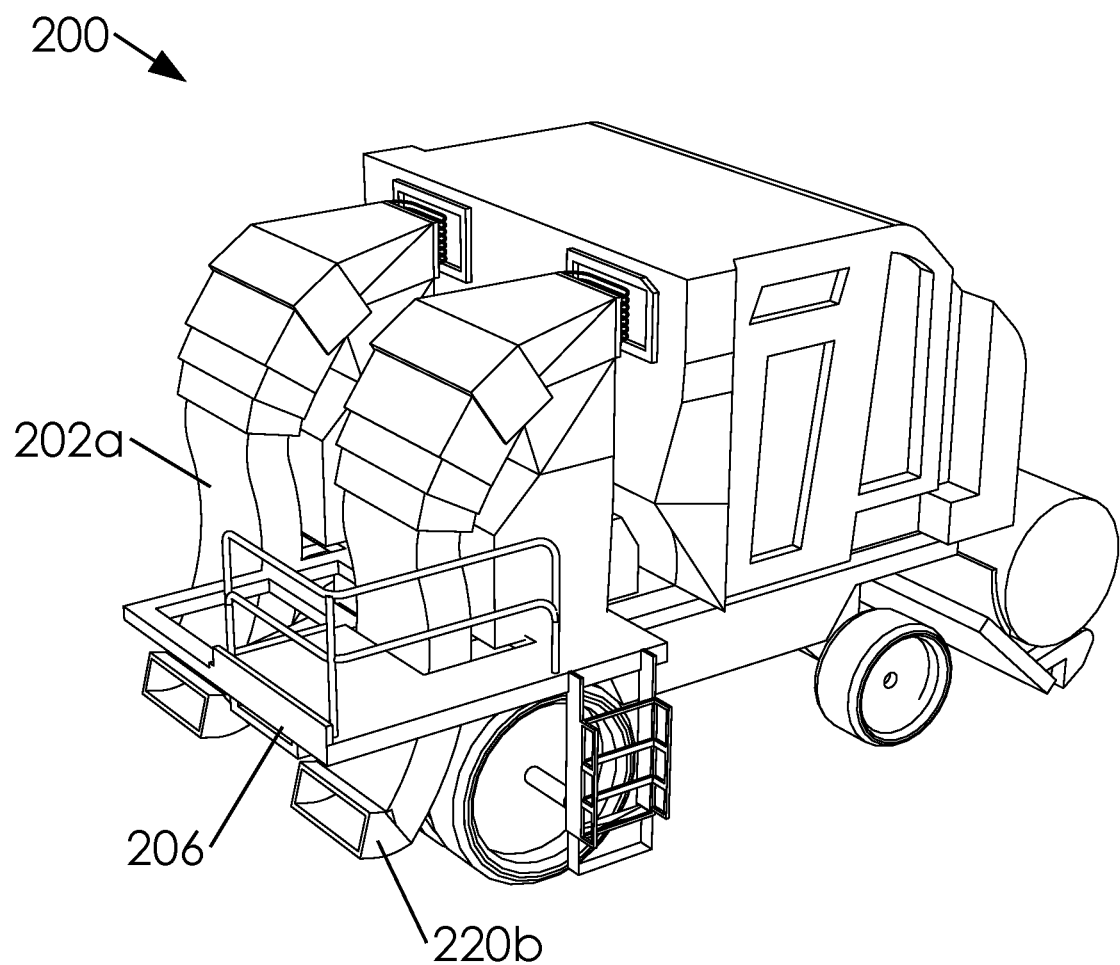
Figure 2E:
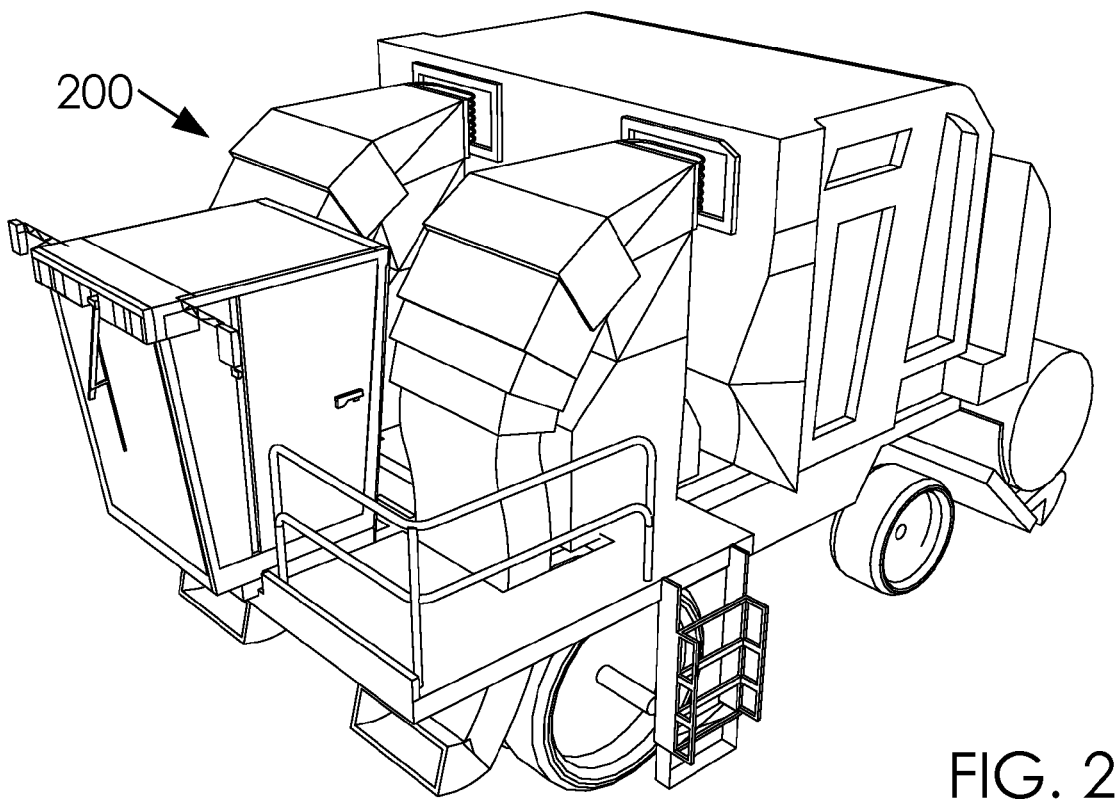
Figure 2F:
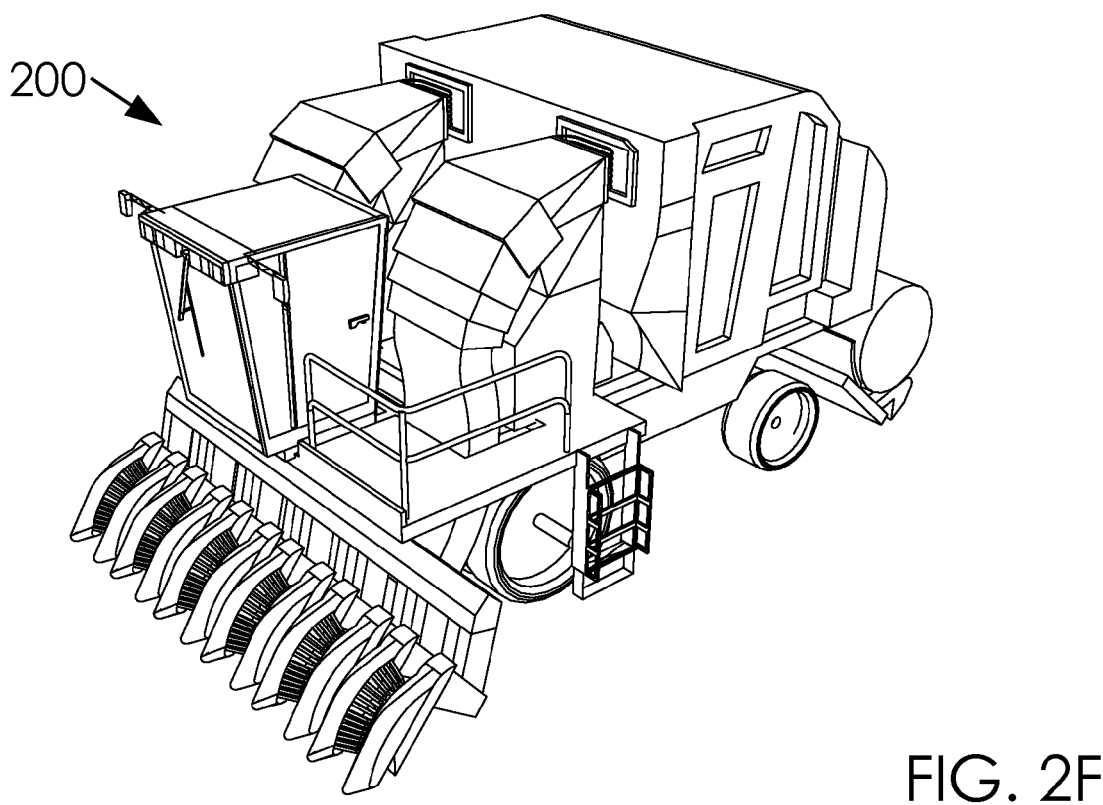

FIGS. 2C, 2D, 2E and 2F illustrate a series of views of said stripper 100 being reconstructed as an improved stripper 200. FIG. 2C illustrates and exploded perspective overview of said improved stripper 200. In one embodiment, said improved stripper 200 can comprise an improved bin 222 having a tank notch 223 and a one or more openings, said extended platform 206, a tank 201, a plurality of ducting units, and a one or more components from said stripper 100, as illustrated. In one embodiment, said plurality of ducting units can comprise a first ducting unit 202a and a second ducting unit 202b. In one embodiment, converting said stripper 100 into said improved stripper 200 can comprise: replacing said platform 106 with said extended platform 206; and installing a tank 201; reattaching said header 108; attaching said plurality of ducting units; and reattaching said cab 104. FIG. 2D illustrates said improved stripper 200 with said plurality of ducting units attached to said extended platform 206. FIG. 2E now includes said cab 104 and FIG. 2F now includes said header 108. In one embodiment, said improved stripper 200 can be manufactured as shown and described rather than converted from said stripper 100. In one embodiment, said platform 106 can be modified to resemble said extended platform 206. In one embodiment, said cab 104 can be attached to a front end of said extended platform 206 and said tank 201 can be attached to a rear end of said extended platform 206. In one embodiment, said tank 201 can store fuel used for powering said improved stripper 200. In one embodiment, said tank 201 can stored in said tank notch 223 and therefore fit flush between said improved bin 222, said extended platform 206 and said cab 104.

In one embodiment, said one or more openings can comprise a first opening 224a and a second opening 224b. In one embodiment, said plurality of ducting units can be attached to (and/or through) said extended platform 206. In one embodiment, said plurality of ducting units can deliver said crops from said header 108 to said improved bin 222 by: harvesting said crops with said header 108; moving said crops into said plurality of ducting units; moving said crops through said plurality of ducting units and into said one or more openings; and storing said crops in said improved bin 222. In one embodiment, said improved stripper 200 can create modules of said crops. In one embodiment, said modules can be round modules (such as said module 120), rectangular modules, or similar. In one embodiment, said improved stripper 200 can be used where said crops are not formed into modules at all; wherein, said bin 102 can hold said crops for further processing as is known in the art. In one embodiment, said one or more openings can comprise opening in an upper portion of said improved bin 222 nearest said cab 104.

Figure 3A:
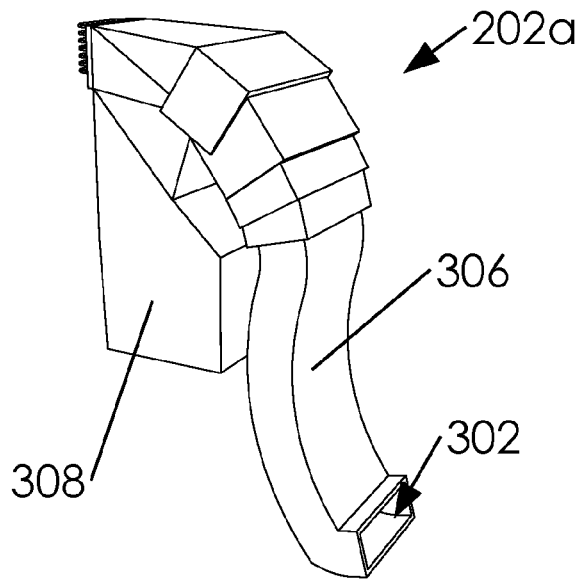
FIGS. 3A, 3B, 3C, and 3D illustrate a perspective overview along with three elevated views of said first ducting unit.
Figure 3B:
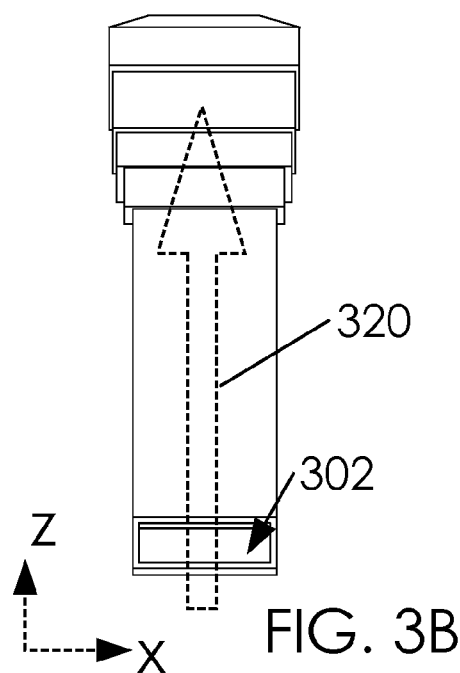
Figure 3C:
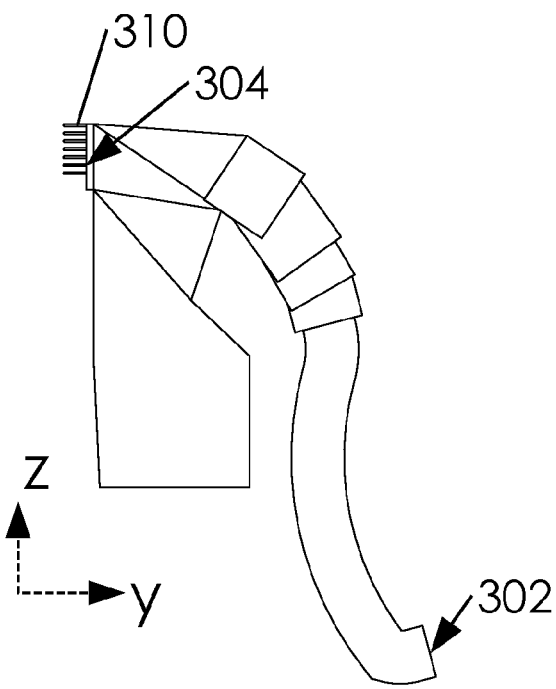
Figure 3D:
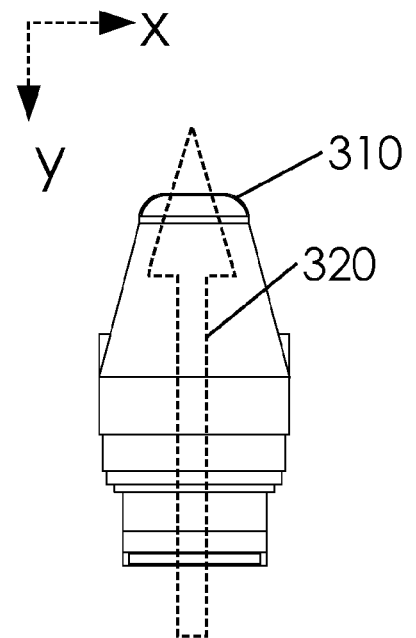

FIGS. 3A, 3B, 3C, and 3D illustrate a perspective overview along with three elevated views of said first ducting unit 202a. FIG. 3A illustrates a perspective overview of said ducting unit 202a. FIGS. 3B, 3C and 3D illustrate an elevated front view, side view and top view of said first ducting unit 202a. In one embodiment, said second ducting unit 202b can be substantially similar to said first ducting unit 202a. In one embodiment, said ducting unit 202a can comprise an entry 302, an exit 304, a passage 306, a base 308, and a plurality of bars 310.

FIGS. 3B, 3C, and 3D further comprise labeling of an x-axis, y-axis, and z-axis. In one embodiment, said passage 306 can comprise a channel for moving said crops through a crop path 320 from said header 108 and/or said ducting system 110 to said bin 102. In one embodiment, said passage 306 can carry said crops from said entry 302 to said exit 304 in said y-axis and z-axis vectors but not said x-axis vector. That is, said passage 306 can move said crop from said header 108 to said bin 102 in a substantially vertical (z-axis) and horizontal (y-axis) channel, but not lateral (x-axis) channel. In one embodiment, forcing said crops to travel in said x-axis (as shown) can cause said crops to clog up in said passage 306 and thereby slow the processing and accumulation of said crops in said bin 102. This is one improvement of the current disclosure over the disclosed prior art of the "Background" section, supra. Put another way, the shape of said passage 306 allows for easy transfer of said crops (i.e., agricultural materials) from said entry 302 to said exit 304. In one embodiment, said crops can exit said passage 306 through said plurality of bars 310. In one embodiment, said plurality of bars 310 can work as a filter to minimize the inclusion of material other than said crop from entering said bin 102.

Figure 4A:
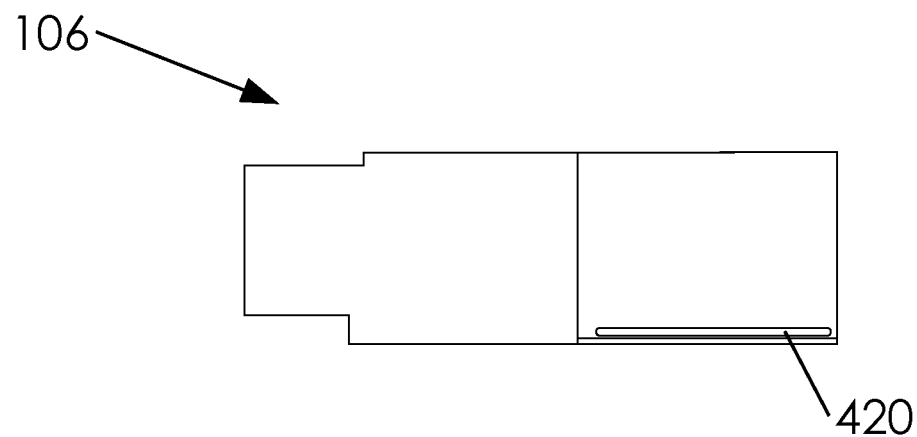
FIGS. 4A and 4B illustrate elevated top views of said platform and said extended platform.
Figure 4B:
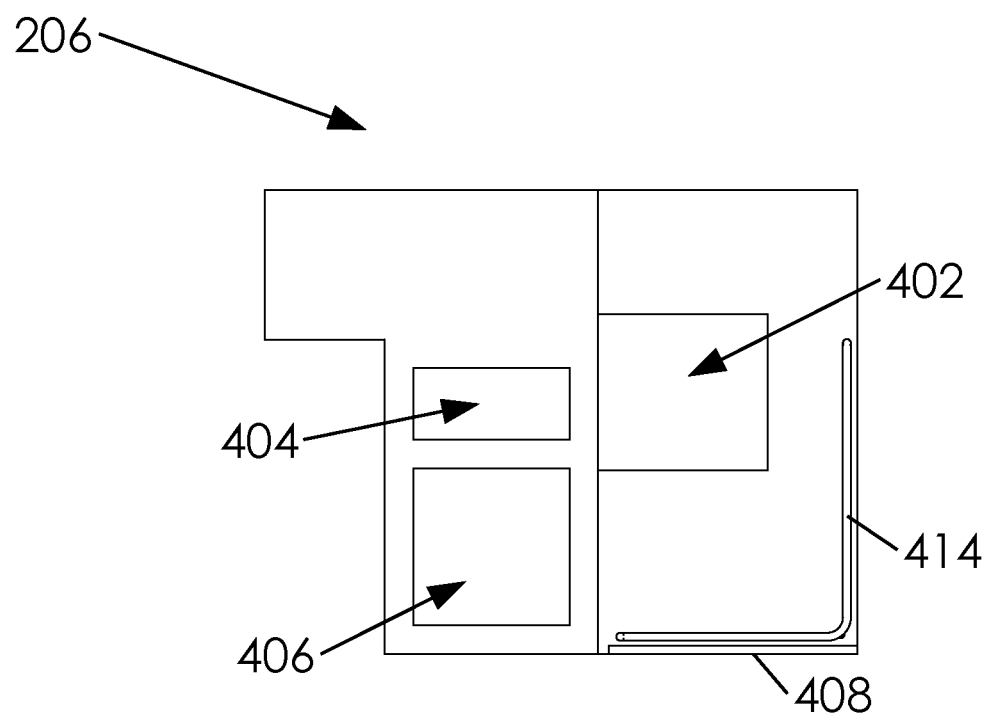

FIGS. 4A and 4B illustrate elevated top views of said platform 106 and said extended platform 206. In one embodiment, said extended platform 206 can comprise a first aperture 402, a second aperture 404 and a third aperture 406. In one embodiment, said second aperture 404 is dimensioned to allow for a portion of said ducting unit 202b to fit through said extended platform 206. In one embodiment, each of said platform 106 and said extended platform 206 can comprise one or more platforms. For example, in one embodiment, said extended platform 206 can comprise a railing 414. In one embodiment, said cab 104 can attach to a portion of said third aperture 406. In one embodiment, passage 306 of said second ducting unit 202b can pass through said first aperture 402. In one embodiment, each of said base 308 of said plurality of ducting units can sit on said extended platform 206. In one embodiment, said platform 106 can comprise a railing 420. In one embodiment, said railing 414 and/or said railing 420 can provide a safety railing for users of said improved stripper 200.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:
1. An improved stripper comprising:
  a plurality of ducting units, a platform, a bin, a header, and a chassis; wherein,
    said platform supporting said plurality of ducting units;

said bin configured for holding a harvested crop;

said header is configured for harvesting said harvested crop;

said plurality of ducting units convey said harvested crop from said header to said bin;

said plurality of ducting units comprise at least a first ducting unit and a second ducting unit;

said chassis supports said platform, said bin, said headers and said plurality of ducting units;

each of said plurality of ducting units comprise a passage between an entry at a first end and an exit at a second end of said plurality of ducting units;

said first end of each of said plurality of ducting units receive a harvested material from said header;

said second end of each of said plurality of ducting units convey said harvested crop into said bin;

each of said plurality of ducting units move said harvested crop from said header to said bin in parallel with one another rather than in series;

said passage of each of said plurality of ducting units are formed between said entry and to said exit in a two vectors;

said two vectors comprise a y-axis and a z-axis;

said y-axis comprises a direction parallel with the forward and rearward direction of travel for said improved stripper;

said z-axis comprises an up and down vector relative to said y-axis;

said passage in each of said plurality of ducting units are configured with bends in said y-axis and said z-axis but not in said x-axis; and by eliminating movement within said channel within each of said plurality of ducting units in said x-axis, said improved stripper is configured for moving said harvested crop from said header to said bin without moving said harvested crop in an x-axis direction and thereby limit clogging of said harvested crop in said passage of said plurality of ducting units.

2. The improved stripper of claim 1 wherein,
said platform comprises an extended platform.

3. The improved stripper of claim 2 wherein,
said improved stripper further comprising a cab;
said cab attaches to a forward portion of said extended platform;
said extended platform further comprise a one or more apertures;
said plurality of ducting units extend through said one or more apertures of said extended platform to said header; and
said harvested crop is delivered from below said extended platform, through said one or more apertures of said extended platform and into said bin.

4. The improved stripper of claim 1 further comprising a cab; wherein, said cab is supported by said platform.

5. The improved stripper of claim 1 wherein,
said bin comprises a one or more openings;
each of said plurality of ducting units pass through a portion of said extended platform at said one or more openings; and
said plurality of ducting units deliver said harvested from said header through said plurality of ducting units, through said one or more openings and into said bin.

6. The improved stripper of claim 1 wherein,
said bin comprises an improved bin;
said improved bin comprises a tank notch configured to provide space for a tank between said one or more ducting units and said improved bin;
said improved stripper comprises said tank;
said tank can be stored between said improved bin, said plurality of ducting units, said platform and said cab and in said tank notch.

7. The improved stripper of claim 1 wherein,
said platform comprises a rail arranged at the edges of said platform and configured to provide a safety barrier for users of said improved stripper.

8. A method of manufacturing said improved stripper comprising:

replacing a platform from a stripper with an extended platform, supporting a plurality of ducting units on said extended platform, and attaching a cab of said stripper at a forward position of said extended platform; and wherein, said stripper further comprises a bin, a header, and a chassis;

said platform supporting said plurality of ducting units;

said bin configured for holding a harvested crop;

said header is configured for harvesting said harvested crop;

said plurality of ducting units convey said harvested crop from said header to said bin;

said plurality of ducting units comprise at least a first ducting unit and a second ducting unit;

said chassis supports said platform, said bin, said headers and said plurality of ducting units;

said first end of each of said plurality of ducting units receive a harvested material from said header;

said second end of each of said plurality of ducting units convey said harvested crop into said bin;

each of said plurality of ducting units move said harvested crop from said header to said bin in parallel with one another rather than in series;

each of said plurality of ducting units comprise a passage between an entry at a first end and an exit at a second end of said plurality of ducting units;

said passage of each of said plurality of ducting units are formed between said entry and to said exit in a two vectors;

said two vectors comprise a y-axis and a z-axis; said y-axis comprises a direction parallel with the forward and rearward direction of travel for said improved stripper;

said z-axis comprises an up and down vector relative to said y-axis;

said passage in each of said plurality of ducting units are configured with bends in said y-axis and said z-axis but not in said x-axis; and by eliminating movement within said channel within each of said plurality of ducting units in said x-axis, said improved stripper is configured for moving said harvested crop from said header to said bin without moving said harvested crop in an x-axis direction and thereby limit clogging of said harvested crop in said passage of said plurality of ducting units.

\* \* \* \* \*